(12) United States Patent
Luo et al.

(10) Patent No.: US 10,197,751 B2
(45) Date of Patent: Feb. 5, 2019

(54) COAXIAL TRANSMITTER OPTICAL SUBASSEMBLY (TOSA) INCLUDING BALL LENS

(71) Applicant: Applied Optoelectronics, Inc., Sugar Land, TX (US)

(72) Inventors: Jianhong Luo, Ningbo (CN); Che-Shou Yeh, New Taipei (TW); I-Lung Ho, Sugar Land, TX (US); Peng Nie, Ningbo (CN)

(73) Assignee: Applied Optoelectronics, Inc., Sugar Land, TX (US)

( * ) Notice: Subject to any disclaimer, the term of this patent is extended or adjusted under 35 U.S.C. 154(b) by 3 days.

(21) Appl. No.: 15/073,309

(22) Filed: Mar. 17, 2016

(65) Prior Publication Data

US 2017/0269313 A1 Sep. 21, 2017

(51) Int. Cl.
*G02B 6/32* (2006.01)
*G02B 6/42* (2006.01)

(52) U.S. Cl.
CPC .......... *G02B 6/4244* (2013.01); *G02B 6/32* (2013.01); *G02B 6/4246* (2013.01); *G02B 6/4263* (2013.01); *G02B 6/4274* (2013.01)

(58) Field of Classification Search
CPC ...... G02B 6/2444; G02B 6/32; G02B 6/4246; G02B 6/4263; G02B 6/4274
USPC ........... 385/15, 33, 74, 88, 92–94; 398/135, 398/138–139
See application file for complete search history.

(56) References Cited

U.S. PATENT DOCUMENTS

| 5,194,105 A | * | 3/1993 | Nguyen ............... B23K 20/02 156/293 |
| 5,216,730 A | | 6/1993 | Demeritt et al. |
| 6,061,493 A | * | 5/2000 | Gilliland ............. G02B 6/4292 385/140 |
| 6,335,869 B1 | | 1/2002 | Branch et al. |
| 6,550,983 B1 | * | 4/2003 | Gilliland ............. G02B 6/4204 385/88 |
| 6,609,838 B1 | | 8/2003 | Branch et al. |
| 6,869,231 B2 | | 3/2005 | Chiu et al. |

(Continued)

OTHER PUBLICATIONS

PCT Search Report and Written Opinion dated Jun. 9, 2017, received in corresponding PCT Application No. PCT/US17/22903, 11 pgs.

(Continued)

*Primary Examiner* — Ryan Lepisto
*Assistant Examiner* — Guy Anderson
(74) *Attorney, Agent, or Firm* — Grossman Tucker Perreault & Pfleger, PLLC; Norman S. Kinsella

(57) ABSTRACT

A coaxial transmitter optical subassembly (TOSA) including a ball lens may be used in an optical transceiver for transmitting an optical signal at a channel wavelength. The coaxial TOSA includes a laser package with a ball lens holder section defining a lens holder cavity that receives the ball lens. The lens holder cavity is dimensioned such that the ball lens is positioned in substantial alignment with the laser diode for optically coupling a laser output from the laser diode into an optical waveguide at an optical coupling end of the TOSA. The coaxial TOSA is thus configured to allow the less expensive ball lens to be used in a relatively small package when a lower coupling efficiency and power is desired and without substantial redesign of the TOSA.

18 Claims, 4 Drawing Sheets

(56) References Cited

U.S. PATENT DOCUMENTS

| | | | |
|---|---|---|---|
| 7,137,745 B2* | 11/2006 | Uekawa | G02B 6/3636 385/14 |
| 7,184,621 B1* | 2/2007 | Zhu | G02B 6/29361 385/24 |
| 7,290,942 B2* | 11/2007 | Kuhara | G02B 6/4206 385/53 |
| 7,352,923 B2* | 4/2008 | Mazed | H04B 10/40 385/14 |
| 7,450,858 B2* | 11/2008 | Verdiell | H01S 5/4087 398/164 |
| 7,917,036 B2* | 3/2011 | Ori | G02B 6/4246 398/136 |
| 7,995,928 B2 | 8/2011 | Du et al. | |
| 8,559,824 B2 | 10/2013 | McColloch et al. | |
| 8,666,254 B2 | 3/2014 | Chan et al. | |
| 8,950,952 B2* | 2/2015 | Pfnuer | G02B 6/4204 385/93 |
| 9,213,156 B2* | 12/2015 | Amit | G02B 6/4206 |
| 9,236,945 B2 | 1/2016 | Ho et al. | |
| 9,553,671 B1* | 1/2017 | Nagarajan | H04B 10/40 |
| 9,614,620 B2 | 4/2017 | Ho et al. | |
| 9,804,352 B2 | 10/2017 | Yeh et al. | |
| 9,876,576 B2 | 1/2018 | Ho et al. | |
| 2005/0189473 A1 | 9/2005 | Schrodinger | |
| 2007/0278666 A1 | 12/2007 | Garcia et al. | |
| 2009/0116838 A1* | 5/2009 | Kihara | G02B 6/4208 398/79 |
| 2009/0129783 A1* | 5/2009 | Ori | G02B 6/4246 398/136 |
| 2011/0164848 A1* | 7/2011 | Bolle | G02B 6/30 385/35 |
| 2014/0029900 A1* | 1/2014 | Logan, Jr. | G02B 6/4281 385/92 |
| 2014/0061451 A1* | 3/2014 | Park | G02B 6/4224 250/227.11 |
| 2014/0105538 A1 | 4/2014 | Toyohara et al. | |
| 2014/0355997 A1* | 12/2014 | Miao | H04B 10/40 398/135 |
| 2016/0043799 A1 | 2/2016 | Zheng et al. | |
| 2016/0197453 A1 | 7/2016 | Luo et al. | |
| 2016/0231581 A1 | 8/2016 | Liu | |
| 2017/0090121 A1* | 3/2017 | Wang | G02B 6/2938 |
| 2017/0269311 A1 | 9/2017 | Wang et al. | |
| 2017/0269313 A1 | 9/2017 | Luo et al. | |
| 2017/0269315 A1 | 9/2017 | Yeh et al. | |
| 2017/0272169 A1 | 9/2017 | Ho et al. | |

OTHER PUBLICATIONS

U.S. Office Action dated Apr. 9, 2018, received in related U.S. Appl. No. 15/591,274, 10 pgs.

* cited by examiner

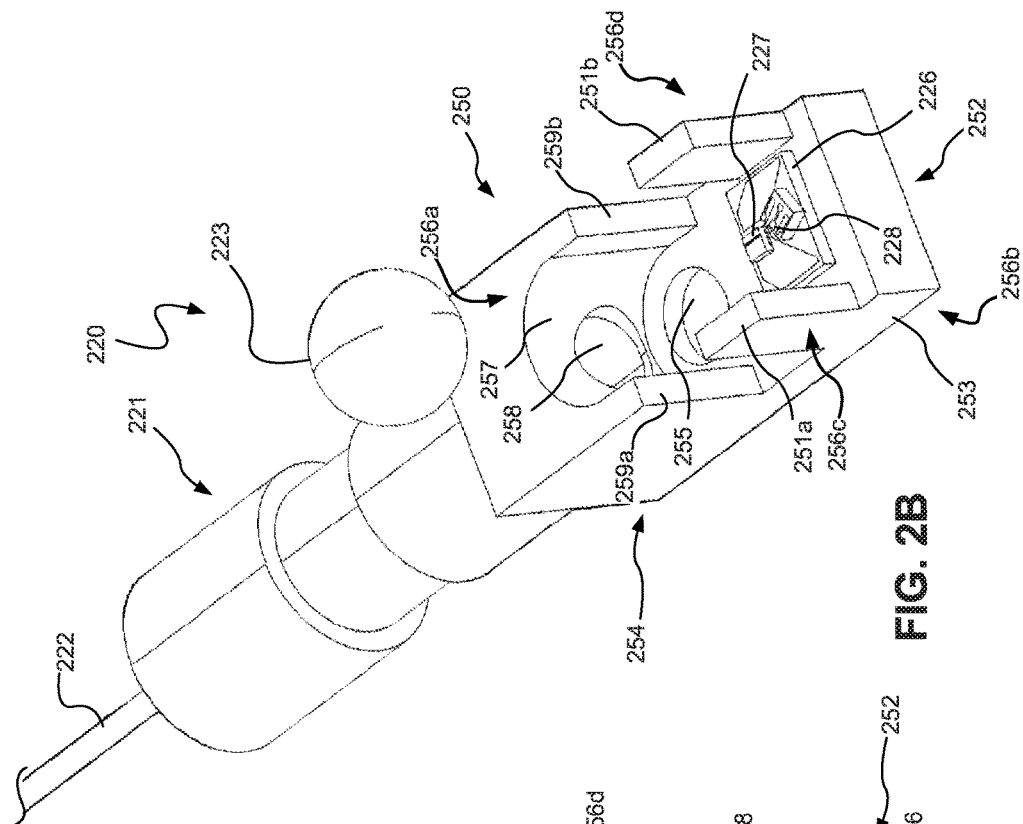
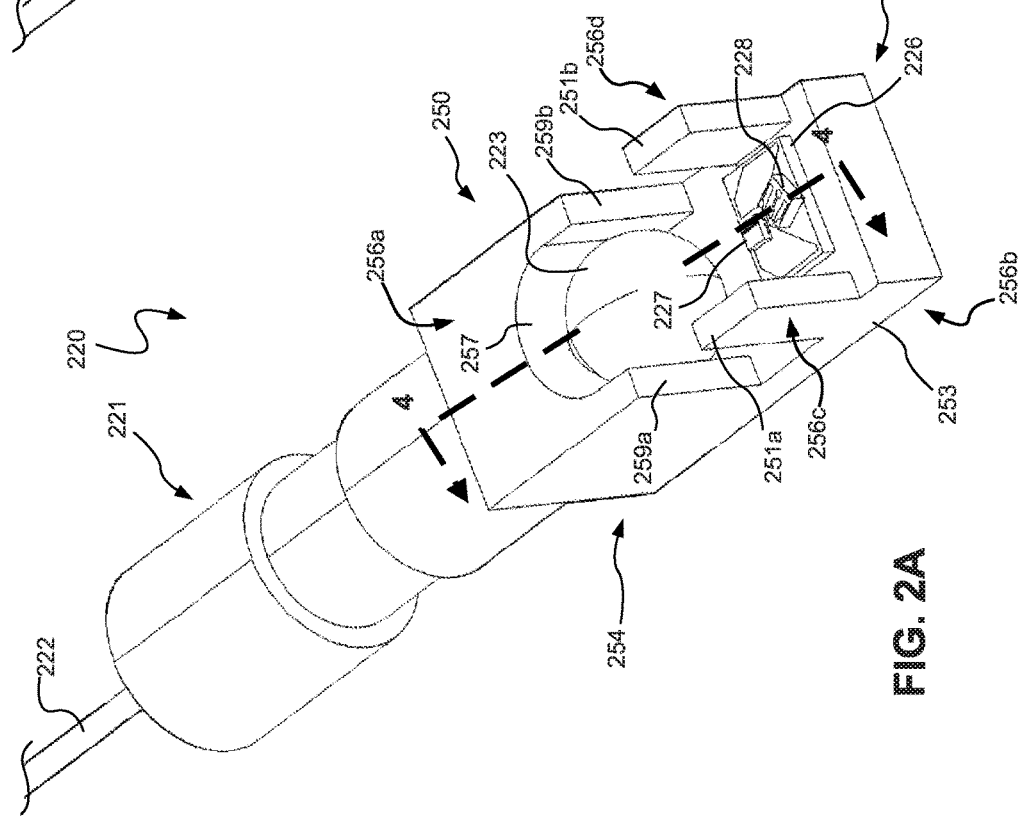

COAXIAL TRANSMITTER OPTICAL SUBASSEMBLY (TOSA) INCLUDING BALL LENS

TECHNICAL FIELD

The present invention relates to optical transmitters and transceivers, and more particularly, to a coaxial transmitter optical subassembly (TOSA) including a ball lens for use in an optical transmitter or transceiver.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more transmitter optical subassemblies (TOSAs) for transmitting optical signals. A TOSA generally includes a laser package for housing a laser diode and a lens optically coupling the laser diode to an optical fiber. In at least one type of TOSA, an aspherical lens is used to provide a relatively high coupling efficiency and the aspherical lens has a square perimeter shape to fit within the laser package. These lenses, however, are often more expensive. Moreover, a lower power output may be desired in some applications without having to redesign the TOSA with a different laser. Thus, the higher coupling efficiency of the aspherical, square lenses may provide a power output that is too high and at a cost that is too high. The design and space restrictions within a TOSA also present challenges with respect to using different lenses.

BRIEF DESCRIPTION OF THE DRAWINGS

These and other features and advantages will be better understood by reading the following detailed description, taken together with the drawings wherein:

FIG. 2A is a top perspective view of a coaxial transmitter optical subassembly (TOSA) with a ball lens positioned in a ball lens holder, consistent with an embodiment of the present disclosure.

FIG. 2B is a top perspective view of the coaxial TOSA in FIG. 2A with the ball lens removed from the ball lens holder.

DETAILED DESCRIPTION

Figure 1A:
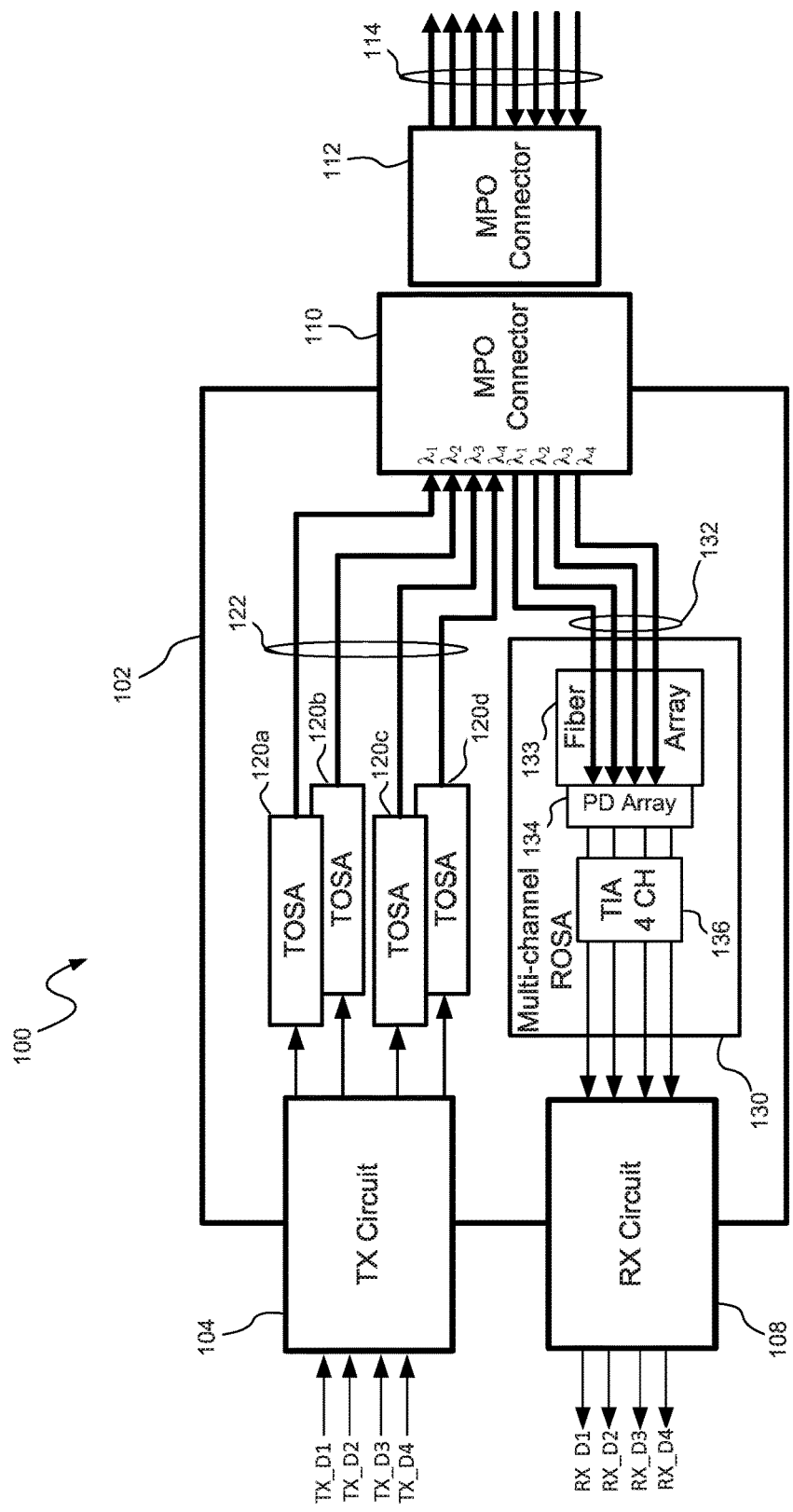
FIGS. 1A and 1B are functional block diagrams of multiple channel optical transceivers, consistent with embodiments of the present disclosure.

A coaxial transmitter optical subassembly (TOSA) including a ball lens, consistent with embodiments of the present disclosure, may be used in an optical transceiver for transmitting an optical signal at a channel wavelength. The coaxial TOSA includes a laser package with a ball lens holder section defining a lens holder cavity that receives the ball lens. The lens holder cavity is dimensioned such that the ball lens is positioned in substantial alignment with the laser diode for optically coupling a laser output from the laser diode into an optical waveguide at an optical coupling end of the TOSA. The coaxial TOSA is thus configured to allow the less expensive ball lens to be used in a relatively small package when a lower coupling efficiency and power is desired and without substantial redesign of the TOSA. The laser package may be a cuboid type TO package, and an optical transceiver may include multiple coaxial TOSAs with the cuboid type TO package stacked in a transceiver housing.

As used herein, a "ball lens" is a lens having a substantially spherical outer shape but is not required to be a perfect sphere. As used herein, a "cuboid type TO package" refers to a laser package structure having a generally cuboid or parallelepiped outer shape formed by at least three substantially flat and orthogonal outer surfaces. For clarification, the term "TO" or "transistor outline" is derived from a reference to the traditional cylindrical package or "can" that historically encased a transistor, but as used herein, is otherwise unrelated to such transistor package. As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

As used herein, "thermally coupled" refers to a direct or indirect connection or contact between two components resulting in heat being conducted from one component to the other component and "thermally isolated" refers to an arrangement where heat is prevented from being conducted to the isolated component from an external environment. In a thermally isolated multi-channel TOSA, for example, heat external to the TOSA is prevented from being conducted to one or more components in the TOSA. As used herein, "thermally shielded" refers to an arrangement that prevents heat from being transferred by convection or radiation to the shielded component. Thermally isolated and thermally shielded do not necessarily require an arrangement to prevent all heat from being conducted or transferred.

Referring to FIG. 1A, an optical transceiver 100, consistent with embodiments of the present disclosure, is shown and described. In this embodiment, the optical transceiver 100 transmits and receives four (4) channels using four different channel wavelengths ($\lambda 1, \lambda 2, \lambda 3, \lambda 4$) and may be capable of transmission rates of at least about 10 Gbps per channel. In one example, the channel wavelengths $\lambda 1, \lambda 2, \lambda 3, \lambda 4$ may be 1270 nm, 1290 nm, 1080 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102. A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 may be flexible printed circuits (FPCs) including at least conductive paths to provide electrical connections and may also include additional circuitry.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Each of the TOSAs 120a-d may be a coaxial TOSA with a coaxial configuration electrically connected at one end to conductive paths on the transmit connecting circuit 104 and optically coupled at the other end to a respective one of the optical fibers 122. Each of the TOSAs 120a-d may include a laser for generating laser light at the assigned channel wavelength and a ball lens for coupling the laser light into the respective optical fiber 122, as will be described in greater detail below. The lasers in the TOSAs 120a-d thus convert electrical data signals (TX_D1 to TX_D4) received via the transmit connecting circuit 104 into modulated optical signals transmitted over transmit optical fibers 122. The lasers may include, for example, distributed feedback (DFB) lasers with diffraction gratings. Each of the TOSAs 120a-d may also include a monitor photodiode for monitoring the light emitted by the lasers. Each of the TOSAs 120a-d may further include one or more temperature control devices, such as a resistive heater and/or a thermoelectric cooler (TEC), for controlling a temperature of the lasers, for example, to control or stabilize the laser wavelengths.

This embodiment of the multi-channel ROSA 130 includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108. Other embodiments of a ROSA may also be used in the transceiver 100 for receiving and detecting one or more optical signals.

This embodiment of the optical transceiver 100 does not include an optical multiplexer or demultiplexer. The optical signals may be multiplexed and demultiplexed external to the optical transceiver 100.

Figure 1B:
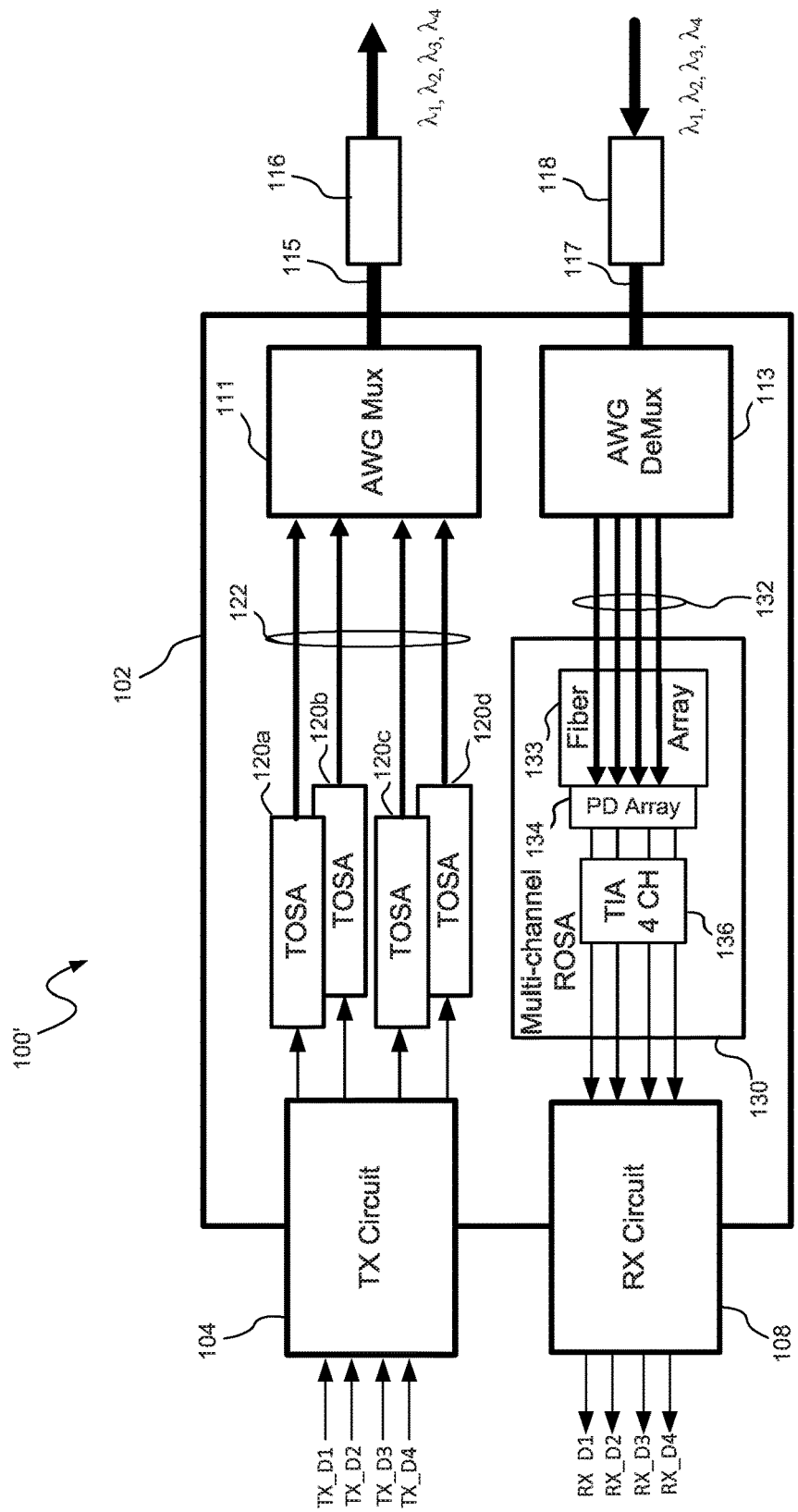

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 10 Gbps per channel and transmission distances of 2 km to at least about 10 km and may be used in internet data center applications or fiber to the home (FTTH) applications.

Referring to FIGS. 2A, 2B, 3 and 4, an embodiment of a coaxial TOSA 220 with a ball lens 223, which may be used in the optical transceivers 100, 100', is described in greater detail.

This embodiment of the coaxial TOSA 220 includes a laser package 250 and an optical fiber coupling receptacle 221 extending from one end of the laser package 250. The laser package 250 contains at least a diode laser 227 and the ball lens 223 for optically coupling the laser 227 to a waveguide in the receptacle 221, such as the respective transmit optical fiber 222 or a separate intermediate optical fiber segment. The diode laser 227 may be electrically connected to a respective transmit flexible printed circuit (not shown).

The laser package 250 includes a base 253 having an electrical connecting end 252 opposite an optical coupling end 254. The laser package 250 further includes a laser mounting section proximate the electrical connecting end 252 and a ball lens holder section proximate the optical coupling end 254. A lens holder cavity 255 in the ball lens holder section receives the ball lens 223 and is dimensioned to position the ball lens 223 in substantial alignment with the diode laser 227 for optically coupling the laser output from diode laser 227 into the optical waveguide in the optical fiber coupling receptacle 221 (e.g., into the optical fiber 222 or into a separate intermediate optical fiber segment). The ball lens 223 is in substantial alignment with the diode laser 227 when the ball lens 223 focuses the laser light into the optical waveguide with a desired coupling efficiency. In one example, the coupling efficiency may be in the range of 15-20%. The ball lens 223 thus allows optical coupling with a lower coupling efficiency for lower power output applications without having to redesign the laser and without having to increase the size of the laser package.

The base 253 of the laser package 250 may have a length in a range of about 4 to 5 mm and a width in a range of about 2 to 2.5 mm. In the illustrated embodiment, the lens holder cavity 255 has a circular perimeter with a diameter (d) in a range of about 1 to 1.3 mm to position the ball lens 223, which has a diameter in a range of about 1.4 to 1.6 mm. More specifically, the lens holder cavity 255 has a diameter of 1.12 mm to position a ball lens 223 having a diameter of 1.5 mm. The depth of the lens holder cavity 255 may be at least about 0.3 mm. The circular perimeter of the ball lens holder cavity 255 thus contacts a corresponding circular perimeter on the ball lens 223 with a corresponding diameter. In general, a smaller diameter lens holder cavity 255 will hold the ball lens 223 in a higher position relative to the laser 227.

Figure 4:
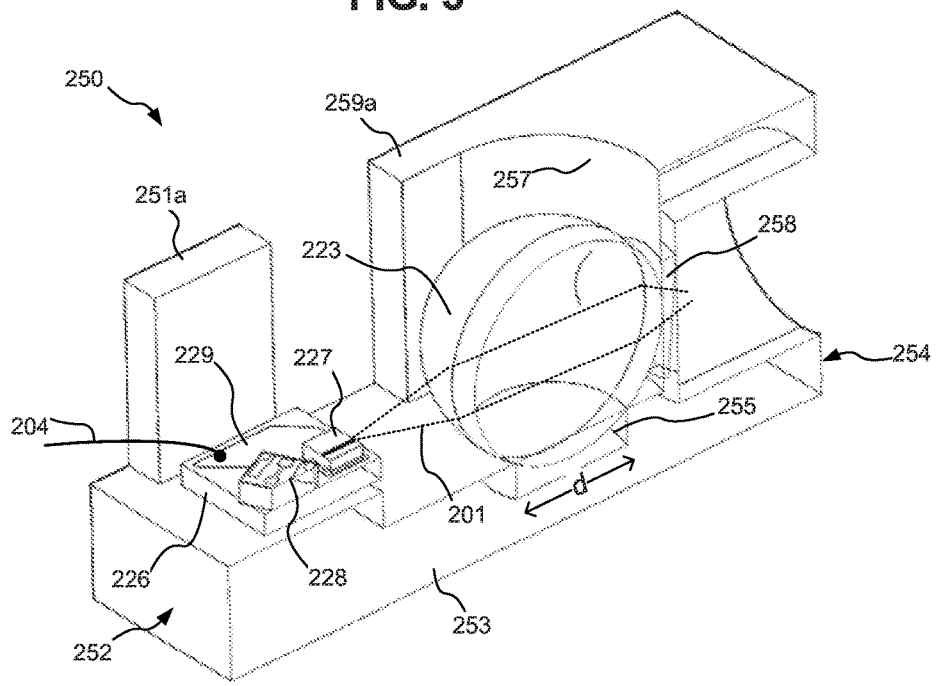
FIG. 4 is a cross-sectional view of the laser package of the coaxial TOSA shown in FIG. 2A with the ball lens.

In the illustrated embodiment, as shown in FIG. 4, the ball lens holder cavity 255 is a cylindrical recess with a depth sufficient to hold the ball lens 223 in a desired position. In other embodiments, the ball lens holder cavity 255 may be a conical recess or may be a hole through the base 253. Other shapes and configurations of the lens holder cavity are also within the scope of the present disclosure. In other embodiments, inserts (e.g., a concave insert, a conical insert or a hollow cylindrical insert) may also be used in the ball lens holder cavity 255, for example, to adjust the position of the ball lens 223 relative to the laser 227.

Figure 3:
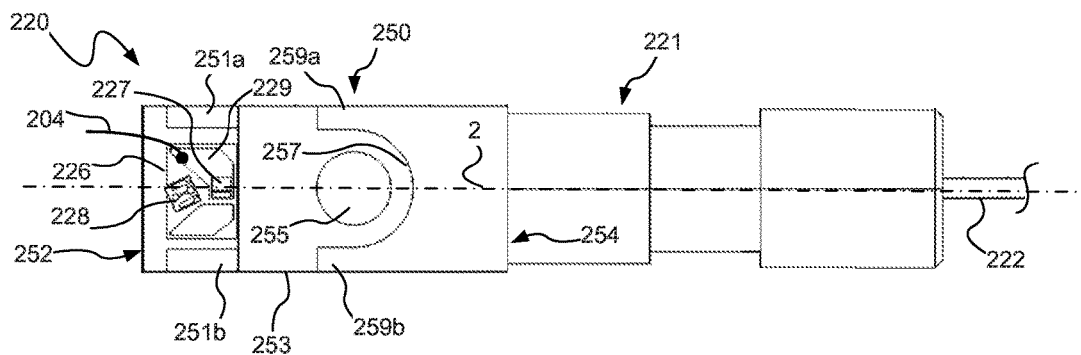
FIG. 3 is a top view of the coaxial TOSA in FIG. 2B without the ball lens.

In the illustrated embodiment, the laser package 250 also includes an arcuate wall 257 extending from the base 253 proximate the optical coupling end 254 for receiving the ball lens 223, thereby further defining the ball lens holder section. The arcuate wall 257 may have a radius of curvature that corresponds to the radius of the ball lens 223. The arcuate wall 257 defines an optical output aperture 258 that allows laser light 201 to pass through for optical coupling (see FIG. 4). Optics, such as an optical isolator, may also be located within the aperture 258. The illustrated embodiment of the laser package 250 further includes lens holder section side walls 259*a*, 259*b* extending from the arcuate wall 257 along sides of the ball holder section. The arcuate wall 257 and the side walls 259*a*, 259*b* thus form a ball lens holder section with a U-shaped cross section, as shown in FIG. 3. The lens holder cavity 255 may be located relative to the arcuate wall 257 such that the ball lens 223 is positioned against the arcuate wall 257.

The optical coupling receptacle 221 extends from the optical coupling end 254 of the laser package 250 for optically coupling the laser 227 to the optical fiber 222. The optical fiber 222 may include, for example, a fiber-terminating ferrule (not shown) at the end of the optical fiber 222, which is received in the receptacle 221 to align an end of the optical fiber 222 with laser light being focused by the ball lens 223. One embodiment of the optical fiber coupling receptacle is described in greater detail in U.S. patent application Ser. No. 15/073,322 entitled Coaxial Transmitter Optical Subassembly (TOSA) with an Optical Fiber Coupling Receptacle, which is filed concurrently herewith and fully incorporated herein by reference.

In the illustrated embodiment, the laser package 250 further includes first and second laser section side walls 251*a*, 251*b* extending from the base 253 to define a laser compartment such that the laser diode 227 is thermally shielded by the side walls 251*a*, 251*b*. The laser 227 may be mounted on a laser submount 226 between the laser section side walls 251*a*, 251*b* proximate the electrical connecting end 252. The laser submount 226 includes conductive paths 229 for providing the electrical connection between the laser 227 and a transmit connecting circuit (not shown), for example, by wire bonding from the conductive paths 229 with electrical leads or wires 204 (see FIGS. 3 and 4). The electrical leads or wires 204 electrically connected to the conductive paths 229 on the submount 226 generally extend from the electrical connecting end 252. The conductive paths 229, the electrical leads 204, the laser 227, the lens 223, the optical coupling receptacle 221 and the optical fiber 222 are generally positioned coaxially along or substantially parallel to a longitudinal axis 2, thereby providing the coaxial configuration of the coaxial TOSA 220.

A monitor photodiode 228 may also be mounted on the submount 226, for example, to monitor light emitted from the diode laser 227. In other embodiments, one or more temperature control devices may be provided within or on the laser package 250. The temperature control devices may include a heater, such as a resistive heater, located adjacent the diode laser 227 to provide independent control of the temperature of the diode laser 227 and thus the wavelength of the emitted laser light. The laser package 250 facilitates this independent temperature control of each laser 227 by preventing heat from outside of the package 250 from affecting the laser 227. Additionally or alternatively, the temperature control device may include a micro thermoelectric cooler (TEC) within the laser package 250 to provide the individual and independent temperature control of the laser 227. A TEC may also be used outside of the laser package 250 by thermally coupling to an outside surface of the laser package 250.

In the illustrated embodiment, the laser package 250 is a cuboid type TO package having a generally cuboid or parallelepiped outer shape to provide heat dissipation and/or thermal shielding. The cuboid type TO laser package 250 includes at least one substantially flat outer surface substantially orthogonal to the electrical connecting end 252 and the optical coupling end 254 for contacting another substantially flat surface to facilitate heat transfer. In the illustrated embodiment, top, bottom, and side surfaces 256*a-d* are substantially flat, which allows multiple cuboid type TO laser packages 250 to be stacked in a transceiver housing. In this embodiment, the bottom surface 256*b* provides the greatest surface area for heat transfer. Other shapes and configurations for the laser package are also possible and within the scope of the present disclosure.

The laser package 250 may be formed as one piece or as multiple pieces attached together (e.g., the walls 251*a*, 251*b*, 257, 259*a*, 259*b* attached to the base 253). Although the illustrated embodiment shows the laser package 250 with a particular shape, other shapes and configurations are also possible. In other embodiments, for example, the cuboid type TO laser package 250 may be closed at the top (e.g., the side opposite the base 253).

The laser package 250 may be made of a thermally conductive material having a thermal conductivity greater than 60 W/(m·K) and more specifically greater than 80 W/(m·K) and, for example, about 160 W/(m·K). The laser package 250 may be made, for example, from copper tungsten and may also be gold plated, for example, to facilitate soldering. In some embodiments, the laser package 250 may be made from a nickel-cobalt ferrous alloy such as the type sold under the trademark KOVAR. Other thermally conductive materials may also be used.

The flat surfaces of the laser package 250 advantageously provide for increased surface area contact between the package 250 and other packages or the transceiver housing. This increased surface area contact improves thermal transfer or heat conduction, and thus facilitates heat dissipation even in a smaller package design compared to traditional cylindrical type TO packages. In a conventional cylindrical type TO can package, the flat surfaces at the ends of the package cannot effectively be used for thermal transfer because it would interfere with the electrical connections and optical couplings made at these ends of the cylindrical type TO can package. The laser package 250 provides the electrical connections and optical couplings at the ends in a coaxial configuration while also providing flat surfaces for thermal coupling and for stacking in a compact arrangement.

Accordingly, the coaxial TOSA, consistent with embodiments described herein, includes a ball lens held within a relative small laser package for optically coupling a laser. The ball lens allows a lower coupling efficiency for lower power applications without having to redesign the laser or increase the size of the laser package.

Consistent with one embodiment, a coaxial transmitter optical subassembly (TOSA) includes a laser package including a base. The base has an electrical connecting end and an optical coupling end opposite the electrical coupling end, a laser mounting section proximate the electrical connecting end of the base, and a ball lens holder section proximate the optical coupling end of the base. The ball lens holder section defines a lens holder cavity. A laser diode is located in the laser mounting section, and a ball lens is positioned within the lens holder cavity of the ball lens holder section. The lens holder cavity is dimensioned such that the ball lens is positioned in substantial alignment with the laser diode for optically coupling a laser output from the laser diode into an optical waveguide at the optical coupling end.

Consistent with another embodiment, optical transceiver module includes a transceiver housing, a plurality of coaxial TOSAs located in the transceiver housing for transmitting optical signals at different channel wavelengths, and a multi-channel receiver optical subassembly (ROSA) located in the transceiver housing for receiving optical signals at different channel wavelengths. Each of the coaxial TOSAs includes a laser package including a base. The base has an electrical connecting end and an optical coupling end opposite the electrical coupling end, a laser mounting section proximate the electrical connecting end of the base, and a ball lens holder section proximate the optical coupling end of the base. The ball lens holder section defines a lens holder cavity. A laser diode is located in the laser mounting section, and a ball lens is positioned within the lens holder cavity of the ball lens holder section. The lens holder cavity is dimensioned such that the ball lens is positioned in substantial alignment with the laser diode for optically coupling a laser output from the laser diode into an optical waveguide at the optical coupling end.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A coaxial transmitter optical subassembly (TOSA) comprising:
    a laser package including:
        a base having an electrical connecting end and an optical coupling end opposite the electrical coupling end;
        a laser mounting section proximate the electrical connecting end of the base;
        a ball lens holder section proximate the optical coupling end of the base, the ball lens holder section includes a lens holder cavity having at least one open end, the lens holder cavity extends at least partially through the base and has a central axis that extends through the open end;
        an end wall extending from the base at the optical coupling end, the end wall defining a receptacle having an arcuate portion that extends at least partially around the lens holder cavity and opens towards the electrical connecting end of the base; and
        a plurality of sidewalls extending from the base at the electrical connecting end, the plurality of sidewalls being spaced apart from the end wall and extending from opposing sides of the laser mounting section;
    a laser diode located in the laser mounting section, the laser diode having an emission axis that extends along the base and transverse to the central axis of the lens holder cavity; and
    a ball lens, at least a portion of the ball lens extending through the open end and into the lens holder cavity of the ball lens holder section, wherein the lens holder cavity is dimensioned such that the ball lens is positioned in substantial alignment with the laser diode for optically coupling a laser output from the laser diode into an optical waveguide at the optical coupling end.

2. The coaxial TOSA of claim 1, further comprising a laser sub-mount disposed on the laser mounting section, the laser submount including conductive paths proximate the electrical connecting end for providing electrical connections, wherein the laser diode is mounted on the laser sub-mount and electrically connected to the conductive paths.

3. The coaxial TOSA of claim 1, wherein the lens holder cavity has a circular perimeter, and wherein a diameter of the lens holder cavity determines a position of the ball lens relative to the laser.

4. The coaxial TOSA of claim 1, wherein the end wall defines an optical output aperture.

5. The coaxial TOSA of claim 4, wherein the arcuate portion of the receptacle has at least a portion with a radius of curvature substantially the same as a radius of the ball lens.

6. The coaxial TOSA of claim 4, wherein the ball lens holder section further includes lens holder section side walls extending from the end wall along sides of the ball lens such that the receptacle has a U-shaped cross-section.

7. The coaxial TOSA of claim 1, further comprising an optical fiber coupling receptacle extending from the optical coupling end of the laser package and configured to receive and optically couple an optical fiber to the laser diode.

8. The coaxial TOSA of claim 1, wherein the laser package is a cuboid type TO laser package having a plurality of substantially flat outer surfaces, and wherein the cuboid type TO laser package is made of a thermally conductive material.

9. The coaxial TOSA of claim 8, wherein at least one of the substantially flat outer surfaces is orthogonal to the electrical connecting end and the optical coupling end.

10. An optical transceiver module comprising:
    a transceiver housing;
    a plurality of coaxial transmitter optical subassemblies (TOSAs) located in the transceiver housing for transmitting optical signals at different channel wavelengths, each of the plurality of coaxial TOSAs comprising:
    a laser package including:
        a base having an electrical coupling end and an optical coupling end opposite the electrical coupling end;
        a laser mounting section proximate the electrical coupling end of the base;

a ball lens holder section proximate the optical coupling end of the base, the ball lens holder section includes a lens holder cavity having at least one open end, the lens holder cavity extends at least partially through the base and has a central axis that extends through the open end;

an end wall extending from the base at the optical coupling end, the end wall defining a receptacle having an arcuate portion that extends at least partially around the lens holder cavity and opens towards the electrical connecting end of the base; and a plurality of sidewalls extending from the base at the electrical connecting end, the plurality of sidewalls being spaced apart from the end wall and extending from opposing sides of the laser mounting section;

a laser diode located in the laser mounting section, the laser diode having an emission axis that extends along the base and transverse to the central axis of the lens holder cavity; and a ball lens, at least a portion of the ball lens extending through the open end and into the lens holder cavity of the ball lens holder section, wherein the lens holder cavity is dimensioned such that the ball lens is positioned in substantial alignment with the laser diode for optically coupling a laser output from the laser diode into an optical waveguide at the optical coupling end; and a multi-channel receiver optical subassembly (ROSA) located in the transceiver housing for receiving optical signals at different channel wavelengths.

11. The optical transceiver module of claim 10, further comprising a laser sub-mount disposed on the laser mounting section, the laser submount including conductive paths proximate the electrical connecting end for providing electrical connections, wherein the laser diode is mounted on the laser sub-mount and electrically connected to the conductive paths.

12. The optical transceiver module of claim 10, wherein the lens holder cavity has a circular perimeter, and wherein a diameter of the lens holder cavity determines a position of the ball lens relative to the laser.

13. The optical transceiver module of claim 10, wherein the end wall defines an optical output aperture.

14. The optical transceiver module of claim 13, wherein the arcuate portion of the receptacle has at least a portion with a radius of curvature substantially the same as a radius of the ball lens.

15. The optical transceiver module of claim 13, wherein the ball lens holder section further includes lens holder section side walls extending from the end wall along sides of the ball lens such that the receptacle has a U-shaped cross-section.

16. The optical transceiver module of claim 10, further comprising an optical fiber coupling receptacle extending from the optical coupling end of the laser package and configured to receive and optically couple an optical fiber to the laser diode.

17. The optical transceiver module of claim 10, wherein the laser package is a cuboid type TO laser package having a plurality of substantially flat outer surfaces, and wherein the cuboid type TO laser package is made of a thermally conductive material.

18. The optical transceiver module of claim 17, wherein at least one of the substantially flat outer surfaces is orthogonal to the electrical connecting end and the optical coupling end.

* * * * *